April 13, 1948.  J. G. JACKSON  2,439,471
CONDUCTOR ARRANGEMENT FOR CURRENT DISTRIBUTION
Filed Aug. 27, 1942  4 Sheets-Sheet 1

INVENTOR
John G. Jackson
BY
ATTORNEY

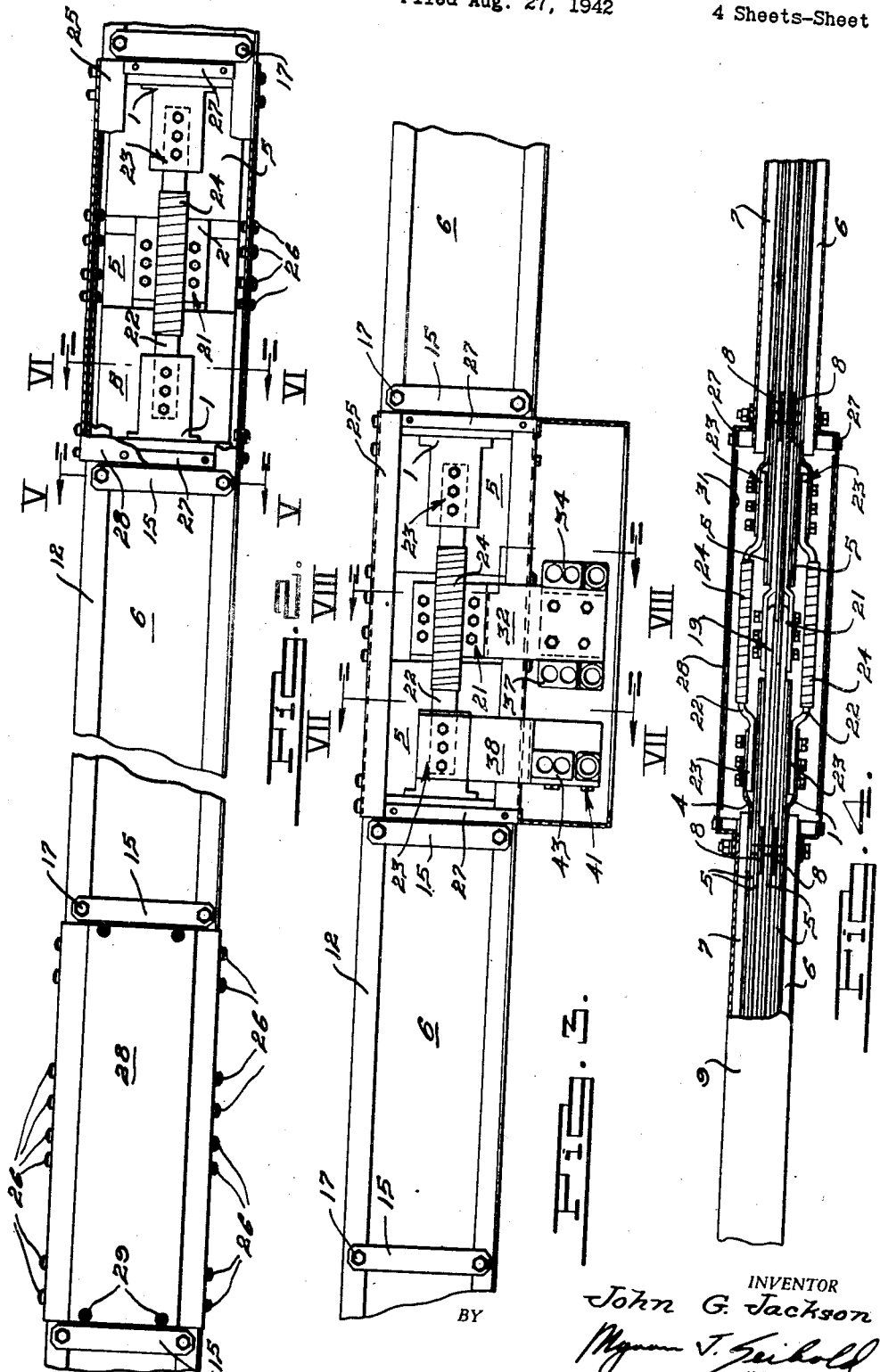

April 13, 1948. J. G. JACKSON 2,439,471
CONDUCTOR ARRANGEMENT FOR CURRENT DISTRIBUTION
Filed Aug. 27, 1942 4 Sheets-Sheet 3
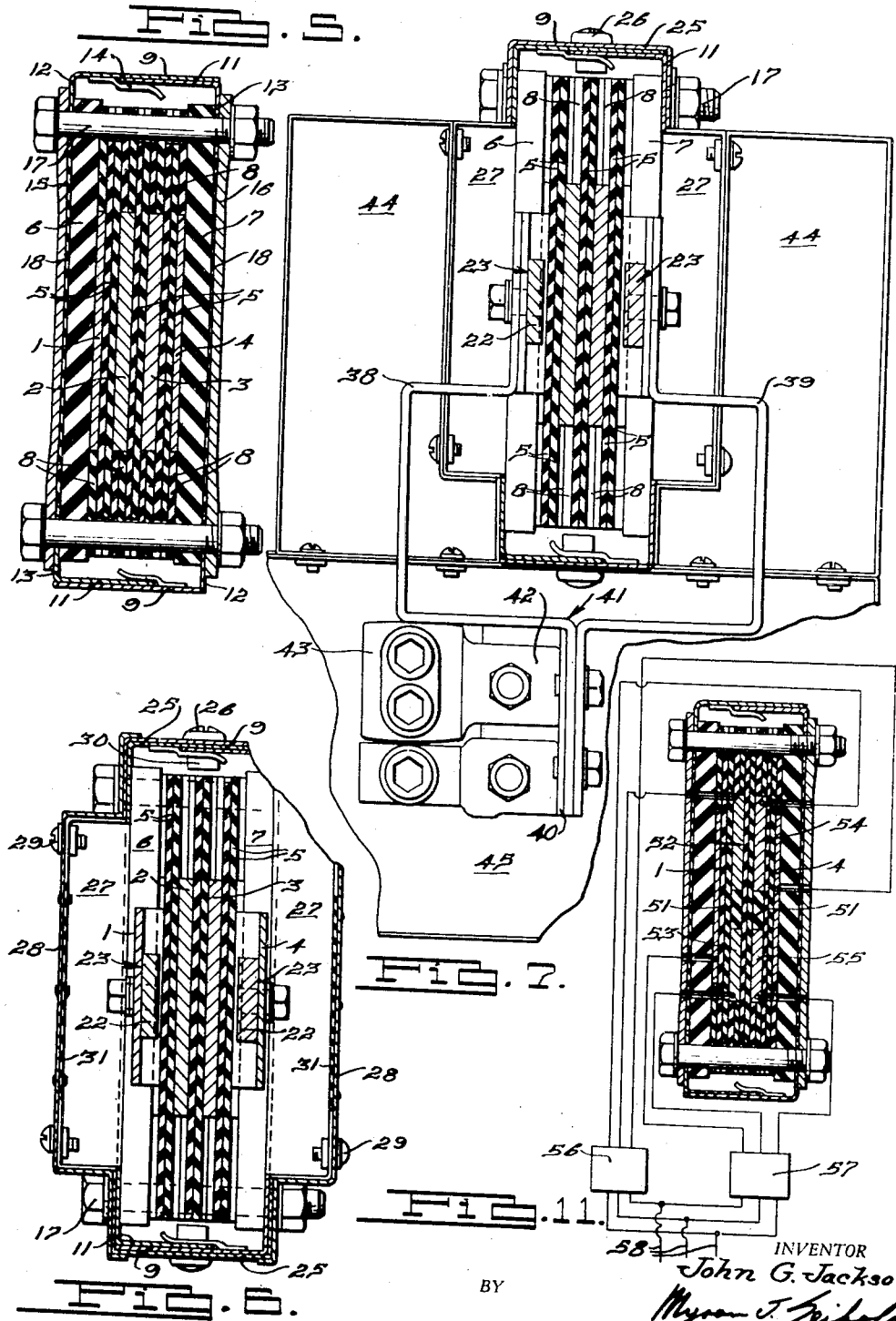
INVENTOR
John G. Jackson
BY
Myron J. Seibold
ATTORNEY April 13, 1948. J. G. JACKSON 2,439,471
CONDUCTOR ARRANGEMENT FOR CURRENT DISTRIBUTION
Filed Aug. 27, 1942 4 Sheets-Sheet 4
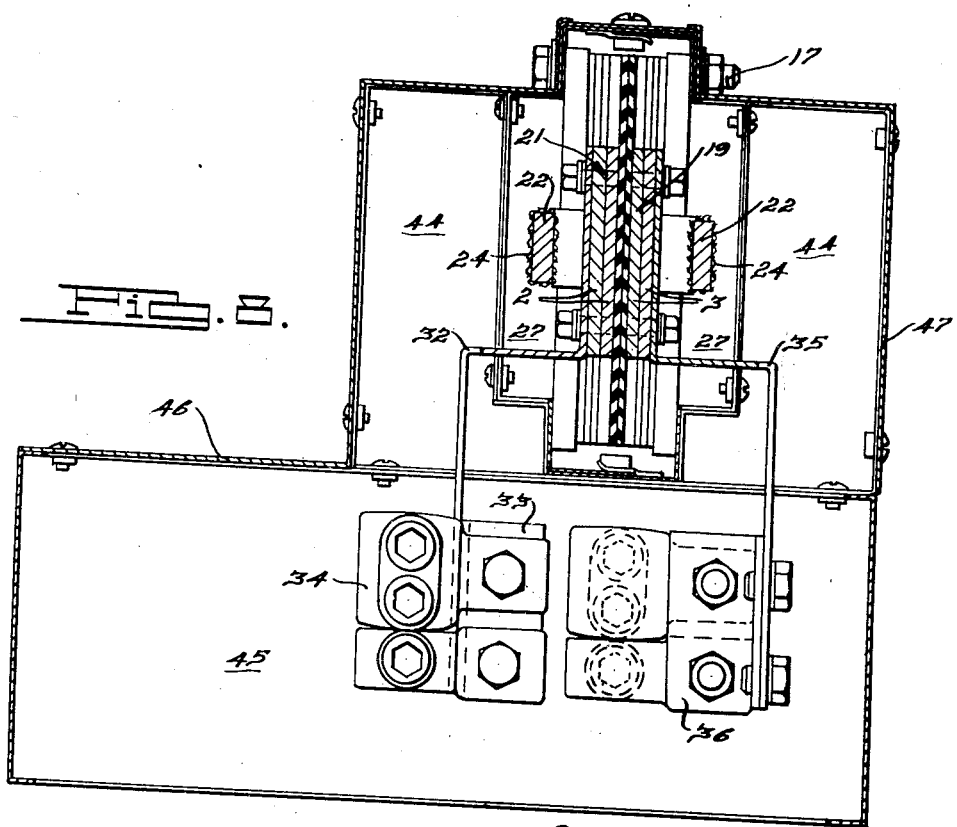
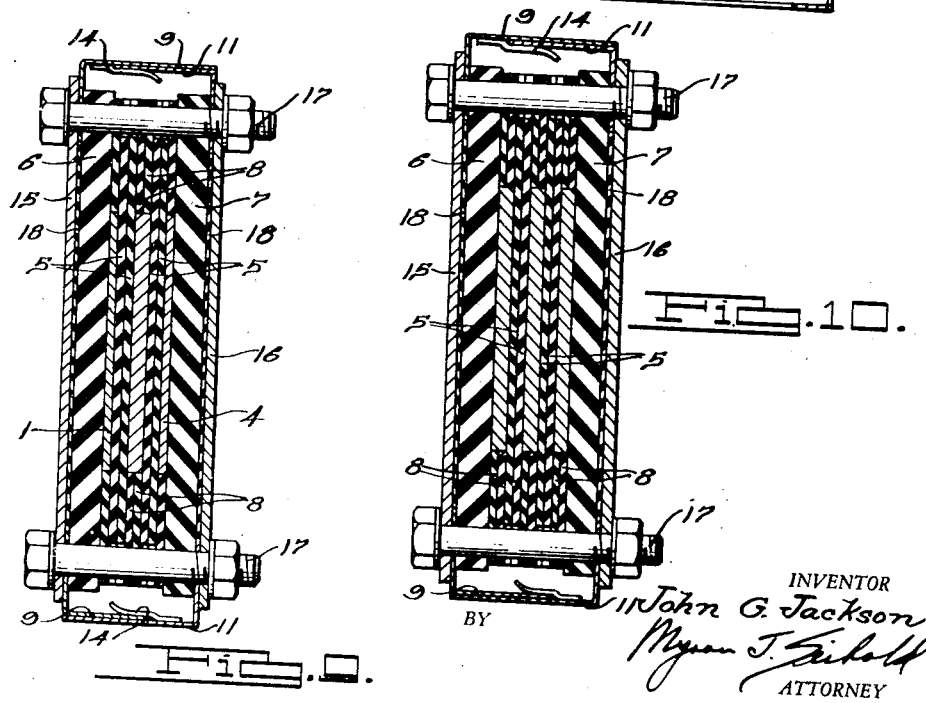
INVENTOR
John G. Jackson
BY
ATTORNEY Patented Apr. 13, 1948

2,439,471

UNITED STATES PATENT OFFICE 2,439,471

CONDUCTOR ARRANGEMENT FOR CURRENT DISTRIBUTION

John G. Jackson, Detroit, Mich., assignor to Square D Company, Detroit, Mich., a corporation of Michigan Application August 27, 1942, Serial No. 456,330

12 Claims. (Cl. 174—68)

This invention relates to current conduction or distribution and more particularly to distribution or feeder buses in enclosed form made up of a plurality of individual sections joined together and with provision for current leadin and tap-off.

One object of the invention is to provide an arrangement of current carrying conductors providing for a very low voltage drop on the passage of alternating current therethrough.

Another object of the invention is to provide a current distribution or feeder duct with enclosed conductors providing for a rapid dissipation of heat and a low temperature rise in the current carrying conductors.

Another object of the invention is to provide a current distribution duct in which individual conductors or bus bars are disposed with a close spacing with insulating material in intimate contact therewith and providing for the rapid dissipation of heat generated therein.

Another object of the invention is to provide a current distribution arrangement of bus bars in which at least one of the buses is divided and disposed in more symmetrical arrangement with other bus bar or bars so as to lower the reactance of the system.

Another object of the invention is the provision of a current distribution duct using a lessened amount of metal in which at least the side walls of the duct are formed by insulating plates clamped in intimate contact with the bus bar assemblies.

Another object of the invention is an improved form of junction means for engaging the adjacent ends of the sections of the continuous distribution duct system and an improved current tap-off arrangement therefor.

Other objects and features of this invention will be readily apparent to those skilled in the art from the specification and appended drawing illustrating certain preferred embodiments in which:

Figure 2 is a side elevational view of the distribution duct according to the present invention, with certain parts broken away.

Figure 3 is a side elevational view of a current tap-off joint with the cover removed.

Figure 4 is a top elevational view of a junction between sections with the top broken away to show the interior construction.

Figure 5 is a transverse sectional view on the line V—V of Figure 2.

Figure 6 is a transverse sectional view on the line VI—VI of Figure 2, with parts broken away.

Figure 7 is a transverse sectional view on the line VII—VII of Figure 3 with parts broken away.

Figure 8 is a transverse sectional view on the line VIII—VIII of Figure 3.

Figure 9 is a modified view similar to Figure 5 but showing a single phase arrangement.

Figure 10 is a view similar to Figure 5 but showing the duct construction without the divided bus.

Figure 11 is a view similar to Figure 5 but illustrating in part diagrammatically the split feeding of the conductor bus bars.

Figure 1:
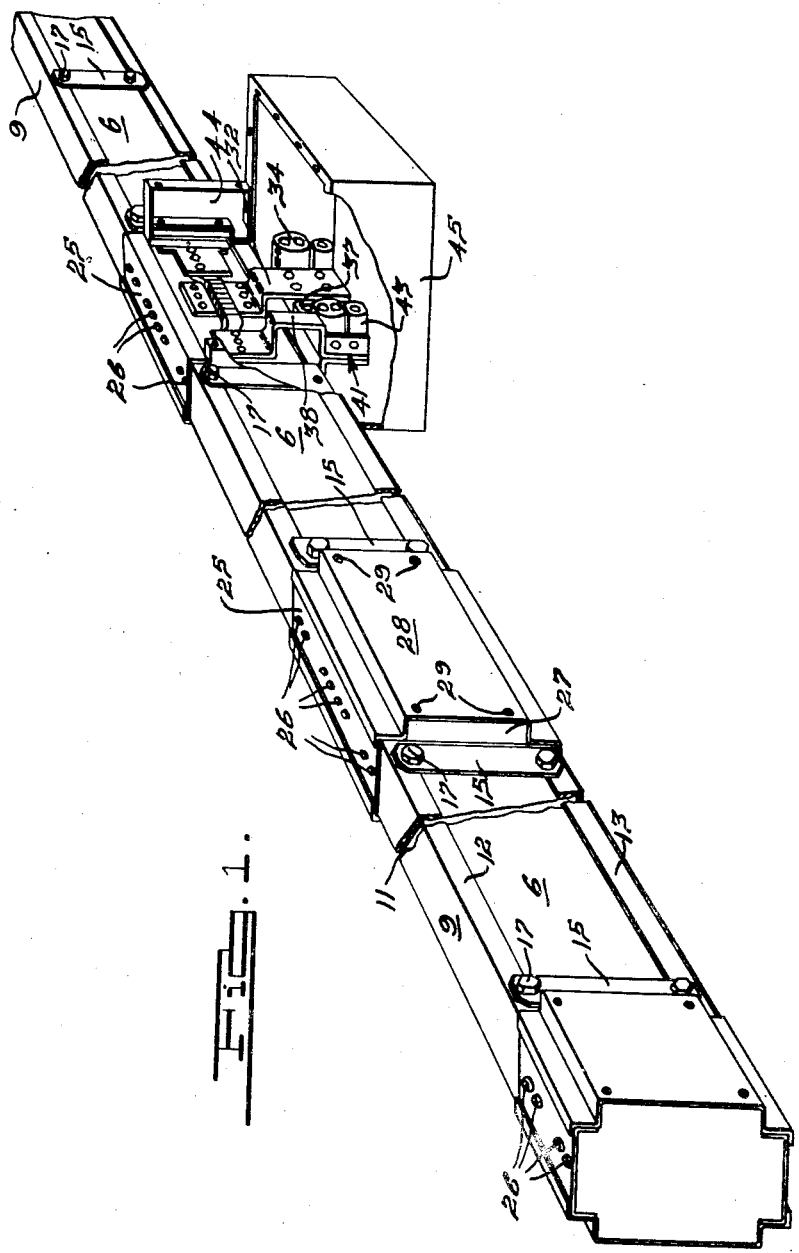
Figure 1 is a perspective view with certain parts broken away of a distribution duct according to the present invention.

In the preferred form of the invention, when applied to a three-phase system, in Figures 1 through 8, the current carrying parts of the duct sections are embodied in four conductors or bus bars, 1, 2, 3, and 4, separated from each other by pairs of elongated insulating sheets 5, the insulating sheets 5 being of a desired minimum thickness for mechanical strength and electrical insulation so as to place the bus bars in very close relation. The bus bars 1 and 4 are only half the size of the bus bars 2 and 3 and are made electrically common and connected to the same phase of a current distribution system, thus, if the source comprises three phases, A, B, and C, bus bars 2 and 3 would be each individually connected to one of the phases; for example, phases A and B and bus bars 1 and 4 would be connected together to the third phase as C. The current of phase C in buses 1 and 4 will be roughly equal so that the phase current arrangement viewing the cross-section of the duct, as in Figure 5, will be C/2, A, B, C/2. This division of one of the phases and the placing of its parallel legs on opposite sides of the other two phases contributes to greatly lower the reactance of the system (in the usual case) and thus greatly lowers the voltage drop therethrough. This conductor arrangement also tends to result in symmetrical (or equal) drop in the several phases. The low reactance resulting in the system is also contributed to by the close relation of the bus bars provided by the thin insulating sheets 5.

Upon the outside of the bus bars 1 and 4 are placed the relatively thick and strong elongated insulating plates 6 and 7. The buses 1, 2, 3 and 4 are properly located within the duct by the short spacer plates 8 placed against their top and bottom edges. All of these insulating plates 5, 6, 7 and 8 may be formed of an impregnated asbestos and cement mixture. The top and bottom of the duct are substantially sealed by a pair of metallic interlocking angle members 9 and 11 having short side flanges 12 and 13, the angles 9 carrying guide clips 14 receiving the ends of the angles 11. The assembly so far described is tightly clamped together with the insulating plates in intimate pressure contact with the bus bars by means of studs and heavy straps of metal or other material which not only maintain the insulating and conducting parts in good heat conducting relation, but also function as surge clamps to resist stresses exerted upon the passage of heavy current surges through the bus bars. These clamps include heavy metal strips 15 and 16 disposed on opposite sides of the assemblage at spaced intervals along its length and clamped together by studs 17 extending through clamping straps 15 and 16, the side flanges 12 and 13 of the angle elements 9 and 11, and through openings or slots in the insulating plates 5, 6, 7 and 8. Each of the sections of the duct is made up of a plurality of pieces of the insulating plates and the junctions of the outer plates 6 and 7 occur beneath certain of the clamping plates 15 and 16. To increase the leakage path at the junctions, each of the straps 15 and 16 is provided with a thin insulating sheet of fibre or other material indicated at 18. The plates 5 between the bus bars are arranged in pairs as shown, again for purposes of increasing the leakage path as their ends are disposed in overlapping relation so that joints between the ends of the plates in a pair are spaced along the length of the duct sections.

A simple joint between sections without current tap-off, as shown in Figures 1, 2 and 4 and 6, will now be described. The adjacent ends of the heavy bus bars 2 and 3 in the two sections are directly bolted together as shown at 19 and 21 in Figure 4. For accessibility, the pairs of insulating plates 5 between bus bars 1 and 2 and between bus bars 3 and 4 are made discontinuous at this point, also as shown in Figure 4, the ends of bus bars 2 and 3 of one of the sections being offset as shown and occupying this space. The insulating plates 5 between bus bars 2 and 3 continue to insulate them from each other in the joint with the junctions between ends of plates in the pair being offset as previously described to increase the leakage path. The bus bars 1 and 4 are shorter in length than bus bars 2 and 3 and at the section joints are connected together by means of metallic straps 22. These straps 22 are bolted to the bus bars 1 and 4 at 23 and are offset from the plane of the bus bars. The mid-portions of the connector straps 22 opposite the connections 19 and 21 are provided with an electrical insulating wrapping 24. The straps 22 are considerably narrower than the buses 1 and 4 so as to provide ready accessibility at the opposite sides of the duct to the joints 19 and 21 between conductors 2 and 3. With this lessened width, the straps 22 are made thicker than buses 1 and 4 so as to maintain the same conducting cross-section.

The joint described is disposed within a readily openable metallic housing as follows:

At the top and bottom of the duct are disposed elongated U-shaped elements 25 secured to the angle members 9 and 11 by means of a plurality of studs 26 extending therethrough and into bosses 30 mounted on the angle members 11. Upon the clamping straps 16 at opposite sides of the joint are rigidly secured, as by welding, flanged brackets 27 and at the opposite sides of the duct there are provided side closure plates 28 overlapping the U-shaped members 25 and secured in position by studs 29 threaded into the flanges on the brackets 27. To secure access to a joint, the studs 29 are removed, whereupon the side plates 28 at the opposite sides of the duct may be taken off and full access is had to the connections 19, 21 and 23. The interior surfaces of the side plates 28 are covered with thin fibre sheets 31 for electrical insulation.

The current feed or tap-off at section joints is shown in Figures 1, 3, 7 and 8. This embodies the electrical connections between sections previously described with the addition of tap-off elements. To the junction 21 is mounted a rigid conducting strap 32 extending below and offset from the plane of the bus bars, as shown more particularly in Figure 8. Upon the conducting strap 32 is mounted an angle bracket 33 on which are rigidly mounted the cable receiving elements 34. Similarly, at the opposite side of the duct, to the joint 19 is rigidly secured a conducting strap 35 extending below the duct and offset to the opposite side of the bus bars and have rigidly connected to its lower portion the angle bracket 36 having rigidly mounted thereon the cable receiving portions 37 for lead-off from bus bar 2. For the divided bus bars 1 and 4, a pair of conducting straps 38 and 39 are connected to opposite junctions 23 and extend downwardly below the duct and there bent inwardly to be joined together at 41. An angle bracket 40 is connected at 41 and upon the bracket are mounted the cable receiving elements 43.

The current take-off junction so described is again enclosed within a readily openable metallic housing. The elements 25 and 27 previously described for a simple junction enclosure remain as before, except that the lower element 25 is omitted. Upon the brackets 27 are mounted flanged spacer elements 44. Upon the bottom flanges of spacer elements 44 is mounted a boxlike cable terminal enclosing portion 45. This construction with cover plate removed is shown in Figure 1. The cover plate 46, as shown in Figure 8, is secured to the flanges at the upper edges of the box 45 and to the flanges on the spacer elements 44 to complete the enclosure at one side of the duct. A simpler closure plate 47 secured to the spacer elements 44 on the other side of the duct is provided. Removal of the plate 47 provides ready access to the connections 19 and 23 at that side of the duct. Removal of the cover plate 46 provides access not only to the bus bar connections, but also to the cable terminals within the box 45.

It is readily understood that the distribution duct previously described may be built up to any desired length from the use of standard length sections with the joints being either simple connections between the adjacent ends of bus bars or, alternately, providing current lead-in or tap-off connections to the bus bars.

The small spacing between the bus bars within the duct and particularly the provision of a pair of electrically common buses at the outsides of the conducting assemblage results in extremely low reactance drop through the distribution system, which drop will be substantially balanced between phases. This provides for good voltage regulation at the translating devices fed from the duct and permits the use of long duct runs with heavy currents while maintaining a minimum voltage drop. It is, of course, to be understood that this bus bar conductor arrangement is of general application, with the bus bars in any other desired duct arrangement or without any enclosing duct.

A very important feature of the invention lies in the low temperature rise within the conductors, this being a limitation on the current carrying capacity thereof. In the duct, as described, the insulating plates 5, 6, and 7 are clamped together and against the conductors or buses in good heat conducting relation. As a result of this, and also as a result of the increased radiating surface provided by the insulating plates which greatly exceed the area of the bus bars, heat dissipation from the conductors or buses is extremely good and their temperature rise low for the currents carried thereby. Further, the insulating plates 6 and 7 have their main surfaces directly exposed to the outside atmosphere so that the heat is more readily dissipated therefrom. As a matter of actual test, the bus bars when thus enclosed with the outer plates 6 and 7 run considerably cooler than when entirely open and directly exposed to the atmosphere and, of course, much cooler than if enclosed with an air space within a metallic duct enclosing structure.

An ancillary feature of the invention lies in a saving of sheet steel ordinarily used in duct enclosures since the sides of the enclosure are formed by the insulating plates 6 and 7.

A further feature of the invention lies in the manner of joining the sections since the joints are readily accessible from the two sides of the duct, while for cable connection purposes the cable connectors are readily accessible from the same side of the duct.

Another advantage in the use of the two electrically common conductors disposed at the outside of the other conductors within the duct, in addition to the low reactance drop, lies in the lessening of the surge force upon the passage of unusual short circuit currents through the bus bars. To a considerable extent, these surge forces will be neutralized by this parallel passage of current in the outside bars which are still quite closely spaced with respect to each other so that the disruptive forces tending to separate the bus bars is greatly reduced. This, plus the heavy surge clamps embodied by the straps 16 and bolts 17, renders the duct extremely strong and capable of passing without harm extremely heavy surge or short circuit currents.

In Figure 9, the invention is shown adapted to a single phase arrangement which would ordinarily employ two conductors. Here, however, one of the conductors is again divided, corresponding to the division represented by the two bus bars 1 and 4 and these divided buses are disposed on opposite sides of the opposite bus bar of the phase. Again the two divided bus bars are electrically common and feed in parallel. This construction similarly results, in the single phase feeding, in the low reactance drop and low temperature rise together with the lessened surge forces discussed in connection with the three phase duct. This is an especially desirable feature for heavy welder circuits, of the spot welder type.

Figure 10 shows a duct construction in which the phases feed through three similar bus bars. This construction does not give as low a reactance drop nor as low a surge force as the split conductor arrangement but the reactance drop is small due to the close spacing of the bus bars and the duct has all the advantages of low temperature rise and saving by the omission of the steel enclosure, this figure showing that the structural features of the duct are contemplated for use with or without the splitting of a conductor.

Figure 11 illustrates, in part diagrammatically, an adaptation of the preferred form of the invention to the split feeding of duct conductors. Such split feeding may be desired when a large duct current carrying capacity is fed through smaller current controlling or protective devices. For example: the current carrying capacity of the duct might be 500 amperes and the current controlling or protective devices have a limiting value of 250 amperes each. In this arrangement, the bus bars 1 and 4 are structurally as previously described, but are no longer electrically common neither at the feeding source nor at the tap-off junctions, except in the sense that they are of the same phase and polarity and direction, and are derived from the same (or similar) source. The two interior conductors are divided and separated by insulating spaces or strips 51, the bus bar 2 being divided into a pair of bus bars 52 and 53, and the bus bar 3 being divided into a pair of bus bars 54 and 55. The two current controlling or protective devices are indicated at 56 and 57. The source of supply at 50 feeds through the circuit protective device 57 to bus bars 52, 54 and 4. The circuit control or protective device 57 connects to bus bars 1, 53 and 55. At current tap-off junctions tap-offs will be individually made to the individually fed groups, as 52, 54, 4 or 1, 53, 55, and the conductors in the two groups, although at the same polarity, and similarly phased, will not be made electrically common, so that the electrical translating devices supplied will be fed by one or the other of the groups and the control device to which it may be connected. In this manner a high current capacity duct may be subdivided into lower capacity circuits and fed through the corresponding protective units, and the features of the preferred form of the invention will be substantially retained, although the value of reactance drop and surge forces may not be at the minimum of the preferred form if the currents are not substantially equal in the two separately fed groups; however, assuming a substantial equality of current, substantially the same desired results will be obtained. This will be especially true with combined circuits having similar load characteristics.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A conductor arrangement for current distribution comprising a plurality of conductors arranged in side by side relation, with the conductors at the opposite sides of the group being electrically common and each of different polarity from the conductor immediately adjacent thereto, said outside electrically common conductors each having a cross-section substantially one-half that of the interior conductors.

2. A three-phase conductor arrangement for the low reactance drop transmission of three-phase alternating current comprising a group of four bus bars disposed side by side in closely spaced relation, with the two interior bus bars insulated from each other and from the outside bus bars and each individually connected to one of the phases of the system, and with the two outside bus bars electrically common and connected to the third phase of the system.

3. A conductor arrangement for the low reactance drop distribution of alternating current comprising a group of four bus bars disposed side by side in closely spaced relation with the two interior bus bars insulated from each other and from the outside bus bars and having the same cross-sectional conducting area and with the two exterior bus bars having the same cross-sectional conducting area but with the cross-sectional conducting area of each of the exterior bus bars being half of the cross-sectional conducting area of the interior bus bars.

4. A conducting arrangement for the low reactance drop transmission of alternating current comprising three bus bars disposed in closely spaced side by side relation, with the interior bus bar insulated from the exterior bus bars, with the exterior bus bars having equal cross-sectional conducting areas, and with the cross-sectional conducting area of the interior bus bar being double that of each of the exterior bus bars.

5. A duct enclosed, conductor arrangement providing for the feeding of a high current capacity duct through low current capacity electric circuit controlling devices comprising conductors arranged within the duct in spaced parallel planes, with conductors in at least certain of said planes spaced edgewise and insulated from each other, electric circuit controlling devices of a combined current capacity to feed said individually spaced conductors at their full current capacity, but each of said circuit controlling devices being of a capacity insufficient to feed all of said conductors at their full current capacity, and means for separately feeding said conductors the full capacity of said electric circuit controlling devices, whereby the circuit controlling devices of relatively lower current capacity will feed the full capacity of the higher current capacity conductor arrangement.

6. A split fed, three-phase, low reactance drop, conductor arrangement comprising a group of six conductors disposed in four parallel planes, with single wire conductors in the outside planes and with pairs of conductors in the interior planes, all of said conductors being electrically insulated from each other and said conductors being fed through electric circuit controlling devices in individual groups of three conductors each, with one exterior and one conductor in each of the two interior planes being fed through one controlling device, and with the other exterior conductor and the other two conductors in the two interior planes being fed from the second controlling device.

7. A current distribution duct comprising a plurality of conductors disposed in closely spaced side by side relation and longitudinally extending insulating plates disposed at the outside of said conductors and clamped thereagainst in direct heat conducting relation, top and bottom closures for said duct engaging the edges of said insulating side plates, said insulating side plates forming the side walls of the duct and providing heat dissipating surfaces therefor.

8. A current distribution duct comprising bus bars disposed in closely spaced side by side relation insulated from each other by thin insulation disposed therebetween and with which they are in intimate contact, and insulating plates disposed against the outer sides of the bus bars and in intimate contact therewith, metallic caps for the opposite edges of the duct enclosing the edges of said insulation, said outer insulation forming substantially the major portion of the side enclosure for the duct.

9. A current distribution duct comprising bus bars disposed in closely spaced side by side relation, insulated from each other by thin insulation disposed therebetween and with which they are in intimate contact, insulating plates disposed against the outer sides of the bus bars and in intimate contact therewith, top and bottom closures for said duct comprising oppositely directed angle plates having legs embracing the edges of said insulating plates, clamping strips disposed against said insulating plates at spaced intervals along the length of the duct, clamping means engaging said clamping strips to clamp the plates and bus bars together.

10. A duct enclosed conductor arrangement for current distribution comprising a plurality of conductors arranged in side by side relation, insulated from each other by thin insulation disposed therebetween and with which they are in intimate contact, conductors at the opposite sides of the group being electrically common and each of different polarity from the conductor immediately adjacent thereto, and insulating plates disposed against the outer sides of said outside conductors and in intimate contact therewith, and top and bottom closures for the duct engaging the edges of the insulating plates to complete the duct enclosure with the insulating plates forming the outer side walls of the duct.

11. A duct enclosed conductor arrangement for current distribution comprising a plurality of conductors arranged in side by side relation, insulated from each other by thin insulation disposed therebetween and with which they are in intimate contact, conductors at the opposite sides of the group being electrically common and each of different polarity from the conductor immediately adjacent thereto, insulating plates disposed against the outer sides of said outside conductors and in intimate contact therewith, top and bottom closures for the duct engaging the edges of the insulating plates to complete the duct enclosure, said insulating plates having a width considerably greater than the bus bar width to provide large heat dissipating surfaces and forming the outer side walls of the duct.

12. A three-phase conductor arrangement for the low reactance drop transmission of three-phase alternating current comprising a group of four bus bars disposed side by side in closely spaced relation, thin sheets of insulating material disposed between said bars and in intimate contact therewith, the two outside bus bars being electrically common and connected to one phase of the system, the two interior bus bars being each individually connected to one of the other phases of the system, and insulating plates disposed against the outer surfaces of said outside bus bars and in intimate heat conducting relation therewith.

JOHN G. JACKSON.

REFERENCES CITED

The following references are of record in the file of this patent:

UNITED STATES PATENTS

| Number | Name | Date |
|---|---|---|
| 531,614 | Guilleaume | Dec. 25, 1894 |
| 1,551,275 | Wagner | Aug. 25, 1925 |
| 1,906,915 | Massey | May 2, 1933 |
| 1,965,182 | Gerlach | July 3, 1934 |
| 2,031,975 | Northrup | Feb. 25, 1936 |
| 2,059,986 | Frank | Nov. 3, 1936 |
| 2,200,776 | Hoover | May 14, 1940 |
| 2,247,088 | Hill | June 24, 1941 |
| 2,261,857 | Novak | Nov. 4, 1941 |
| 2,287,502 | Togesen | June 23, 1942 |
| 2,350,601 | Frank | June 6, 1944 |
| 2,376,307 | Bosch | May 15, 1945 |